United States Patent
Chou et al.

[11] Patent Number: 5,813,031
[45] Date of Patent: Sep. 22, 1998

[54] CACHING TAG FOR A LARGE SCALE CACHE COMPUTER MEMORY SYSTEM

[75] Inventors: Wen-Hwa Chou, Taipei; Yueh-Yao Nain, Hsing Chu; Hsin Hsia Wei, Taipei; Chi-Fang Ma, Hsinchu, all of Taiwan

[73] Assignee: Industrial Technology Research Institute, Chutung Shinchu, Taiwan

[21] Appl. No.: 790,521

[22] Filed: Jan. 29, 1997

Related U.S. Application Data

[63] Continuation of Ser. No. 309,956, Sep. 21, 1994, abandoned.
[51] Int. Cl.⁶ ...................................................... G06F 12/08
[52] U.S. Cl. ........................................... 711/122; 711/168
[58] Field of Search ..................................... 395/444, 449, 395/495; 711/117, 122, 168, 3, 118

[56] References Cited

U.S. PATENT DOCUMENTS

| | | | |
|---|---|---|---|
| 4,349,871 | 9/1982 | Lary | 395/800 |
| 4,914,582 | 4/1990 | Bryg et al. | 395/455 |
| 5,136,700 | 8/1992 | Thacker | 395/449 |
| 5,285,323 | 2/1994 | Hetherington et al. | 711/122 |
| 5,345,576 | 9/1994 | Lee et al. | 711/122 |
| 5,361,391 | 11/1994 | Westberg | 395/464 |
| 5,369,753 | 11/1994 | Tipley | 711/122 |
| 5,412,787 | 5/1995 | Forsyth et al. | 395/417 |
| 5,430,683 | 7/1995 | Hardin | 365/227 |
| 5,450,563 | 9/1995 | Gregor | 711/3 |
| 5,577,227 | 11/1996 | Finnell et al. | 711/122 |
| 5,623,627 | 4/1997 | Witt | 711/122 |

*Primary Examiner*—Eddie P. Chan
*Assistant Examiner*—Hiep T. Nguyen
*Attorney, Agent, or Firm*—Proskauer Rose LLP

[57] ABSTRACT

A computer system cache memory has a caching tag which stores a subset of the L2 cache memory tag store. The caching tag is smaller, faster memory device than the L2 cache memory. The cache memory latency is reduced because the tag access time and tag comparison time are improved due to the caching tag. The caching tag may be manufactured to be located on the same chip as the cache controller, which allows faster data access than if the caching tag is located on a separate chip.

14 Claims, 3 Drawing Sheets

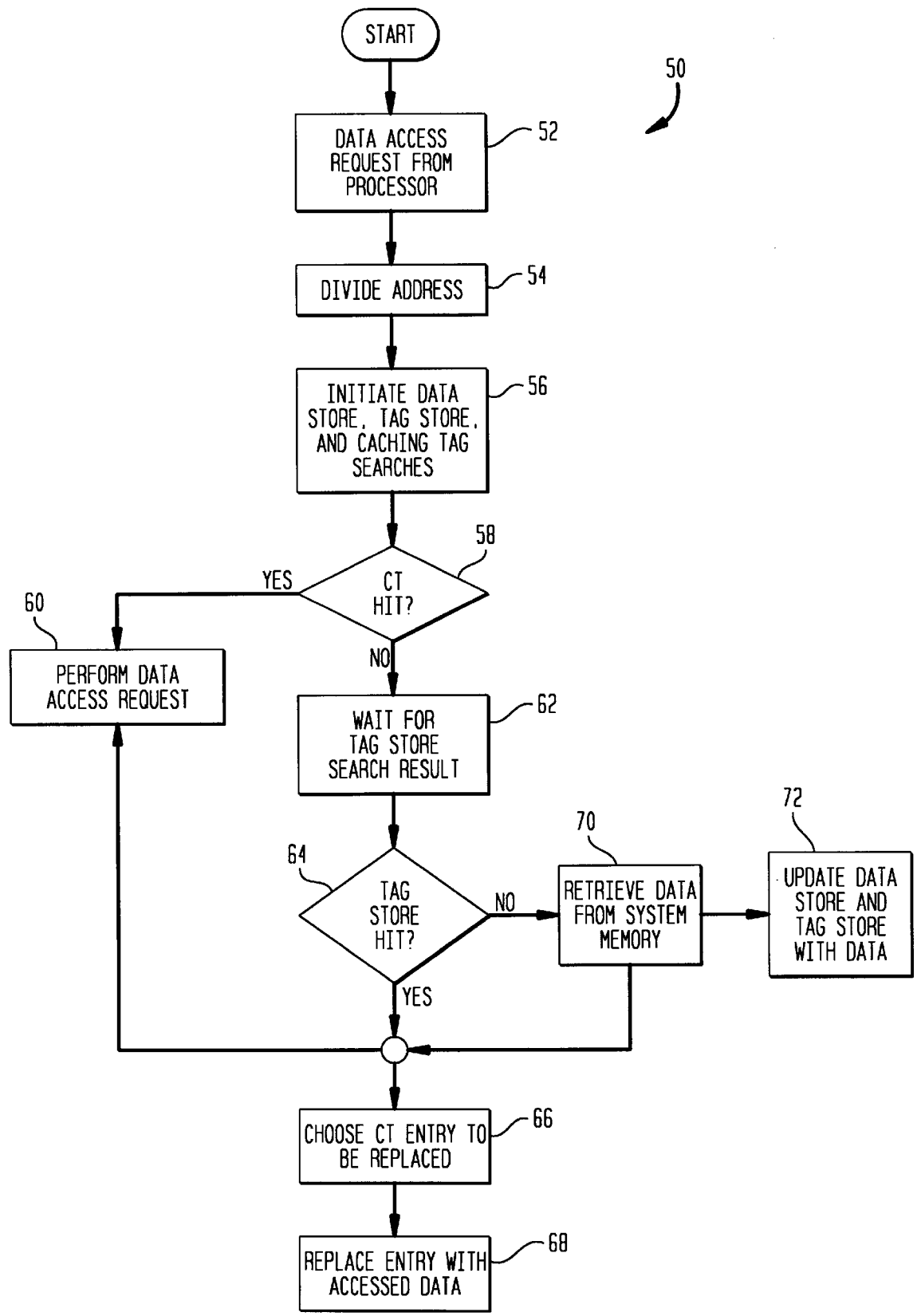

CACHING TAG FOR A LARGE SCALE CACHE COMPUTER MEMORY SYSTEM

This is a continuation, of U.S. patent application Ser. No. 08/309,956, entitled "CACHING TAG FOR A LARGE SCALE CACHE COMPUTER MEMORY SYSTEM", filed Sep. 21, 1994 for Wen-Hwa CHOU et al., now abandoned.

FIELD OF THE INVENTION

The present invention is directed to a cache memory module for a large scale computer memory and, more particularly, to a caching tag for decreasing the cache memory access latency.

BACKGROUND OF THE INVENTION

FIG. 1 shows a computer system 10. The computer system 10 has one or more processors 11-1, 11-2, . . . , 11-N connected via an associated cache memory 13-1, 13-2, . . . , 13-N to a system bus 14. A system memory 16 (or shared memory) and an input/output (I/O) bridge 18 are also connected to the system bus 14. An input/output device 20, such as a computer keyboard and display screen, is connected to I/O bridge 18. For illustrative purposes, the invention will be described with respect to a single processor. However, it is apparent to one skilled in the art that the present invention may be used for a computer system having a plurality of processors.

The processors 11-1 to 11-N execute program instructions. In the course of executing these instructions, the processors may issue data access commands (i.e., data read and data write commands). Program instructions are stored as data in the system memory 16.

The system memory 16 includes an array of storage locations for storing data. Data is typically organized into lines or blocks of data words. A typical data word consists of eight bits. A data block or line may comprise of a number of data words and may preferably be between one and sixteen words. Each storage location, or address, is represented by a number which includes a unique identifier called a tag, which uniquely identifies each stored block of main memory. The tag may be, for example, the six most significant binary digits in the address. The tag is used in data access commands (i.e., read and write commands) for specifying the address from which data should be read or into which data should be written. The system bus 14 transfers data addresses and commands between the devices, i.e., the processors 11-1 to 11-N, cache memories 13-1 to 13-N, system memory 16, and I/O bridge 18, connected thereto.

The cache memories 13-1 to 13-N are small, high speed memories for maintaining a duplicate copy of a subset of the data in the system memory 16. Most modern computer systems include a processor 11 and a system memory 16. The speed at which the processor 11 can decode and execute instructions to process data has for some time exceeded the speed at which instructions and operands can be transferred from system memory 16 to the processor 11. In an attempt to reduce the problems caused by this mismatch, many computers include a cache memory 13 or buffer between the processor 11 and system memory 16.

The main purpose of a cache memory is to shorten the time necessary to perform memory accesses. The cache memory 13 holds temporarily those portions of the contents of main memory which it is believed will be used in the near future by the processor. The information located in cache memory may be accessed in much less time than that located in main memory. Thus, a processor with a cache memory needs to spend far less time waiting for instructions and operands to be fetched and/or stored. For example, in typical large, high-speed computers, main memory can be accessed in 300 to 600 nanoseconds; information can be obtained from a cache memory on the other hand, in 50 to 100 nanoseconds. For such machines, the cache memory produces a very substantial increase in execution speed. However, the performance of the computer system is still limited in instruction execution rate by cache memory access time. Additional increases in instruction execution rate can be gained by further decreasing the cache memory access time.

Cache memories speed up the flow of instructions and data into the processor 11 from the system memory 16. This is important because the access time for the system memory system 16 is usually quite slow. During the time between the data access command and the data being received, the processor 11 is in the "wait state". If no cycle (the time to read or write one word of data) passes between these events, it is a zero-wait state response. If one cycle passes, it is a one-wait state response. To access more efficiently data at a high rate, cache memories are typically built from bipolar RAM devices (e.g., static random access memories or SRAMs) or associative memory devices, which have faster cycle times than MOS RAMS (i.e., DRAMs), which are the type of memory devices typically used to build system memories.

Despite the relatively small size of the cache memory 13 in comparison to the system memory 16, the cache memories 13 dramatically reduce the number of data accesses to the system memory 16. This is because cache memories 13-1 to 13-N exploit a well-known property of processor data access references: the property of locality. The property of locality has two aspects, temporal and spatial.

Temporal locality means that the information which will be in use in the near future is likely to be already in use. This is due to the tendency of a processor 11 to access the same data over and over. This property arises from program flow control instructions such as loops, branches, and subroutines which cause the processor to repeat execution of certain recently executed instructions.

Spatial locality means that portions of the address space which are in use generally consist of a fairly small number of contiguous segments of that address space. This property arises from the sequential nature of program instruction execution, i.e., the processor tends to execute instructions in the sequential order in which they are stored as data. In order to exploit this property, cache memories typically store an entire data line corresponding to a recently accessed data.

The cache memories 13-1 to 13-N operate as follows. When the corresponding processor, e.g., the processor 11-1, issues a data access request, the associated cache memory 13-1 determines if it contains the accessed data. If so, a read or write (depending on whether the processor issued a read or write command) hit occurs and the cache memory 13-1 satisfies the data access request by sending the copy of the data to the processor. If the cache memory 13-1 does not contain the accessed data, a read or write miss occurs. In the event of a read or write miss, the cache memory 13-1 issues a command for reading the data line corresponding to the accessed data from the system memory 16. The cache memory 13-1 receives and stores a copy of the data line. The cache memory 13-1 may then satisfy the data access request by sending the copy of the data line stored therein to the processor (for a "read" command) or writing new data over the data stored in the cache memory (for a "write" command).

Several years ago, computing requirements did not demand as much memory as is typically required in contemporary computers. At that time, a single integrated circuit (chip) could hold both the processor and the entire system memory. Now, however, because system memories are much larger, the storage space on the chip with the processor became inadequate and system memories were built on separate chips and the on-chip memory was used as a cache memory. As the memory requirements for computing have increased, it has also become desirable to increase the cache memory size, as well. Because cache memory requirements have increased, a second level of cache memory is often used which may be on a separate chip. FIG. 2 shows a cache memory module 30 and a system memory 16. A single chip 32 holds the processor 11 and a small, first level cache memory L1. A second level of cache memory L2 is placed on one or more separate chips 34.

FIG. 3 shows a conventional L2 cache memory. The L2 cache comprises a cache controller 36 which executes the cache functions, a data store 38 which stores all of the recently accessed data lines, and a tag store 40, which stores the unique identifiers for the data lines currently in the data store 38.

The cache memory may be arranged in any number of well-known memory organizations. Three preferred alternative organizations are direct-mapped, associative mapped, and set-associative mapped. Regardless of the memory organization, a cache memory comprises a number of blocks, each block having its own data and address tag.

When the processor 11 generates a data access request for a read or write command, the address of the requested data is received by the cache controller 36. As seen in FIG. 3, the address includes a tag address 39a and a line (or block) address 39b. The cache controller 36 separates the tag address tag from the line address. The line address 39b points to the appropriate line (or block) in the data store 38. The line address 39b is used as an index to access the correct entries in the data store 38 and the tag store 40. When the tag store entry is accessed, the cache tag is compared with the address tag from the processor request. If they match (a "hit"), the corresponding data from the data store is used to fulfill the data access command. That is, the data is sent to the processor if a read command was issued; and the data is overwritten if a write command was issued. If there is no match (a "miss" or "no hit"), the requested data is not stored in the cache and must be retrieved from the system memory 16. The data retrieved from the system memory is then stored in the L2 cache according to an updating protocol selected by a computer design engineer according to the computer system design. These protocols are well known to those skilled in the art. One well-known protocol is known as Least Recently Used, wherein the least recently used data line is selected to be replaced by the new data. It is not material to the present invention which protocol is used and therefore further discussion, of the updating protocol is omitted.

The cache memory access latency (or speed) depends on three variables:

(1) the time to access the data in the tag store 40;
(2) the time to compare the tag store data with the tag address; and
(3) the time to retrieve the data from the data store 38 after a "hit". The cache memory access latency is sometimes slowed down due to a "bottleneck" during the tag store access time because there must be a tag hit or miss before any data is sent to the processor or retrieved from the system memory.

Another consideration in decreasing tag access and comparison times is whether or not the data is stored on the same chip as the cache controller. Typically, the cache controller and the tag store are located on same chip because of their relatively small size and high speed requirements. (Searching and retrieving data on a separate chip is typically much slower because, for example, the inductance of the chip pins.) Thus, it is preferable to store data on the chip having the cache controller, resulting in improved tag access and comparison times.

In the illustrative example of FIG. 3, the cache controller 36 and L2 tag store 40 may be built on the same chip 32 as the processor 11, and the L2 data store 38 may be built on a separate chip 34. Speed and memory size design considerations guide the computer designer to choose a preferred arrangement. Two trends exist in cache design, depending on the goal of the designer. It is faster, but more expensive, to build the tag store 40 on the same chip as the cache controller 36 as shown in FIG. 3. FIG. 3 shows L2 comprising two chips. A first chip 32 includes the cache controller 36 and the tag store 40. A second chip 34 includes data store 38. The expense lies in the difficulties in building the large memory tag store 40 on the same chip as the cache controller 36. The result, however, is very fast tag access and comparison times resulting in a zero-wait state cache memory. On the other hand, it is less expensive, but the results slightly slower, to locate the entire L2 cache memory on a separate chip from the cache controller. The cache controller 30 is built on the same chip as the processor 11. A second chip includes the data store 38 and the tag store 40. This allows the cache memory to be made from standard, "off the shelf" memory devices and results in a one-wait state cache memory.

One prior art method of improving cache memory access latency is disclosed in U.S. Pat. No. 4,914,582 Bryg et al. This reference discloses that each data block in the cache memory contains data, an address tag, and a smaller "lookaside tag" derived from the standard address tag. The "lookaside tag" is an arbitrary subset of bits copied from every tag in the tag store, but having fewer bits than are necessary to perform a tag comparison. When a data access request is received, the line address is used as an index to look up a group of blocks. The "lookaside tag" pulls a selected portion (set) of data from one of the blocks. This portion (set) is then compared with the corresponding part of the address. If there is a match, the compared portion (set) is selected for retrieval.

Therefore, it is an object of the invention to provide an improved cache memory which avoids this bottleneck and improves the cache memory access latency.

It is a further object of the invention to provide a cache memory having a caching tag on the same chip as the cache controller.

SUMMARY OF THE INVENTION

The present invention achieves these and other objects by providing a caching tag for storing copies of a subset of the tags in the L2 cache memory tag store. The caching tag is a smaller, faster memory device than the L2 cache memory tag store and data store. The cache memory latency is reduced because the tag access time and tag comparison time are improved due to the caching tag. Because the caching tag relies on the principal of locality, but on a smaller scale than the tag store, it is statistically likely that the tag for requested data is stored in the caching tag.

The present invention also achieves these and other objects by providing for a method for accessing data in response to a data command in a system having a cache memory comprising a data store, tag store, cache controller, and caching tag. This method includes simultaneously initiating searches of the data and tag stores and the caching tag. Because the caching tag is a smaller, faster memory device than the tag store, the caching tag search should determine whether the tag of the requested data is in the caching tag. If so, the corresponding data line from the cache data store is used to fulfill the data command. If there is no caching tag hit, the computer system waits for the results from the tag store search. If a tag store search determines that the requested data line is in the cache data store, the corresponding data line from the data store is used to fulfill the data command and the caching tag is updated to include the tag for this most recently requested data. If the tag store comparison determines that the requested data is not in the cache data store, the requested data line is retrieved from the system memory and then used to fulfill the data command; and the cache data store, tag store, and caching tag are updated to include the retrieved data or its corresponding tag, respectively.

The caching tag is preferably manufactured on the same chip as the cache controller, which allows faster data access than if the caching tag is located on a separate chip connected to the cache controller by a bus. The tag store and data store may be on a separate chip.

BRIEF DESCRIPTION OF THE DRAWINGS

These and other objects of the invention will be understood in more detail in conjunction with the following drawings:

FIG. 5 is a flow chart illustrating the process performed by the cache memory according to the present invention.

DETAILED DESCRIPTION OF PREFERRED EMBODIMENTS

Figure 1:
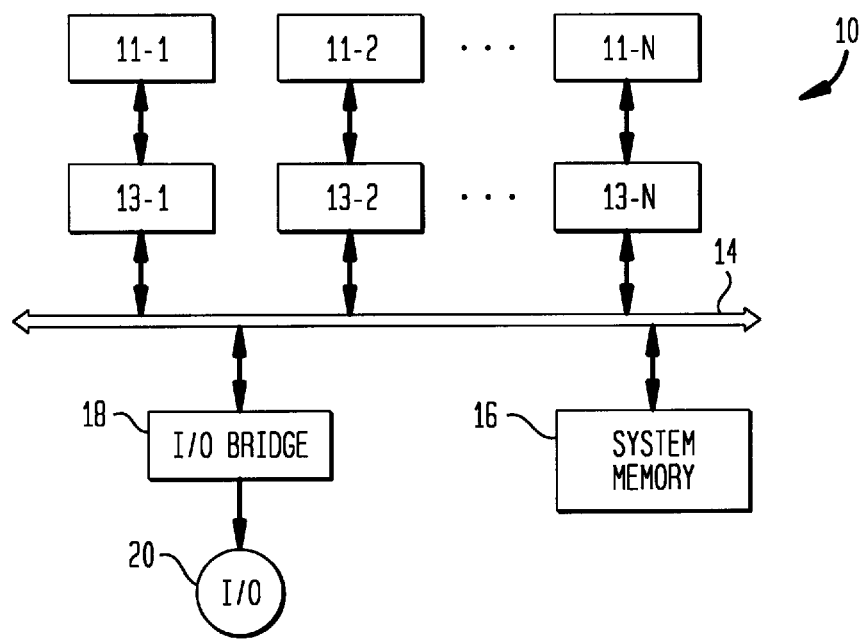
FIG. 1 is a schematic drawing of a conventional computer system.
Figure 2:
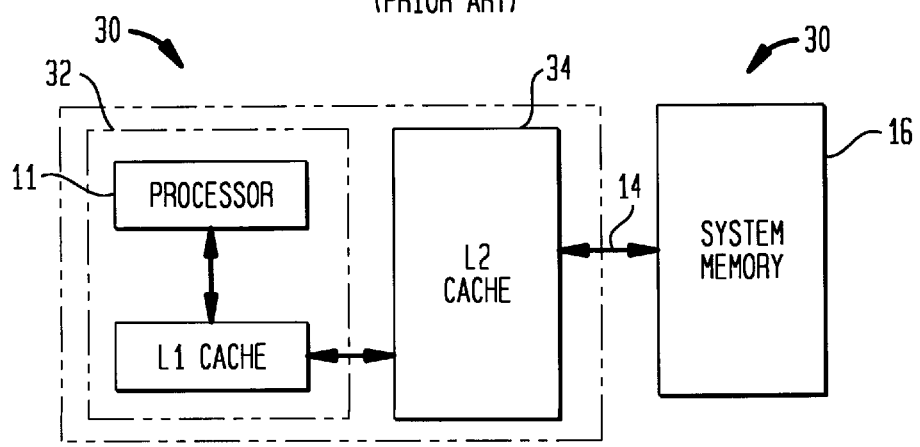
FIG. 2 is a block diagram showing a conventional cache memory module having two levels of cache memory.
Figure 3:
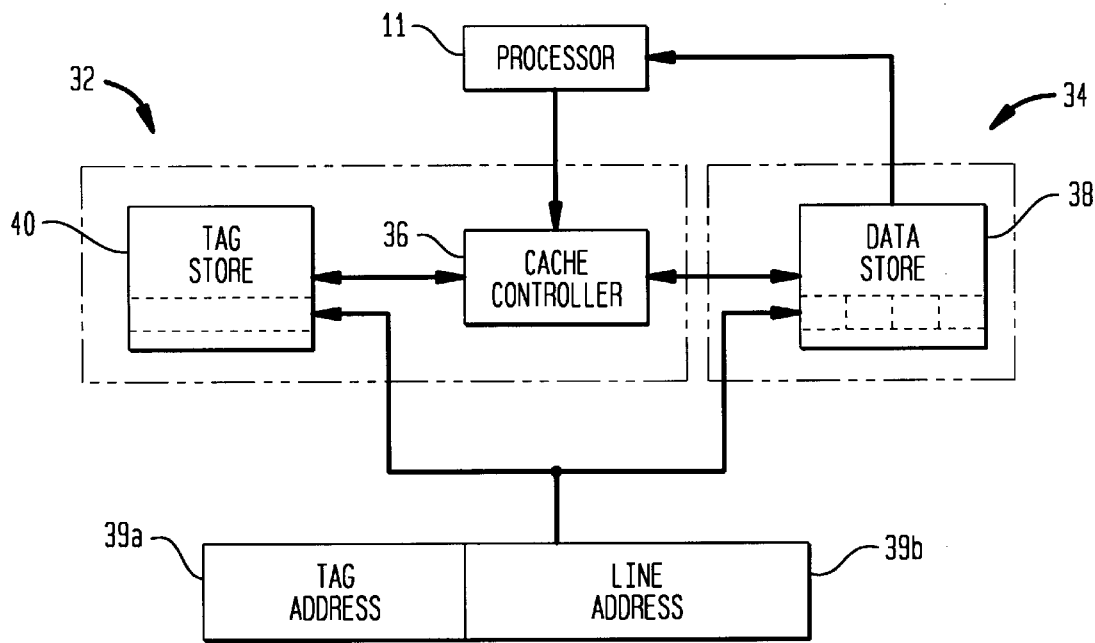
FIG. 3 is a block diagram of a conventional level 2 cache memory, an associated processor, and an illustration of a data address and how it is used to locate data.
Figure 4:
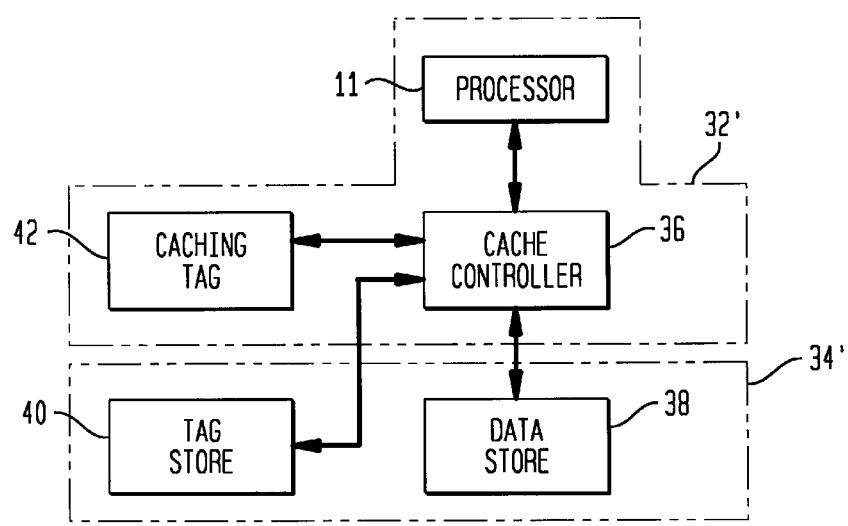
FIG. 4 is a block diagram of a first embodiment of a level 2 cache memory according to the present invention, and an associated processor.

FIG. 4 shows an improved cache memory module L2 according to the present invention. This module L2 has a conventional cache controller 36, data store 38, and tag store 40. The cache memory module L2 also has a caching tag 42. The caching tag is a small, fast memory device, for example, a static RAM (SRAM) which preferably is faster than the tag store 40 memory device. The CT memory may be organized in any well-known memory organization, preferably one of direct mapped, associative mapped, or set associative mapped. Stored in the caching tag (CT) 42 is preferably a complete copy of some of the tag store 40 entries. Thus, a complete copy of a subset of the tags in the tag store 42 is found in the CT 42. In this illustrative embodiment, the cache controller 36 and CT 42 are located on the same chip 32'. The data store 38 and the tag store 40 on located on a second chip 34'. The data store 38 and cache controller 36 are connected to the processor 11. Preferably, the cache controller 36 and CT 42 are on the same chip as the processor 11. As seen in FIG. 2, the level 1 cache (not shown) is preferably located on the same chip as the processor 11.

FIG. 5 is a flow chart of the process 50 performed by the cache memory module shown in FIG. 4. When the processor 11 issues a data access request (step 52), for either a data read or data write command, the address of the requested data is received by the cache controller 46. The cache controller 36 divides the address tag from the rest of the address (step 54) in the conventional manner. The portion of the address divided from the address tag, for example a line address, is used to access the correct entries in the data store 38 and the tag store 40 in the conventional manner. Simultaneously, this address is also used to access the correct entry in the caching tag 42 (step 56). The CT search should access the entry much quicker than the tag store search (assuming the entry is contained in the CT), preferably in zero-wait time, because of the small size and fast speed of the CT 42 memory device and because it is preferably on the same chip as the cache controller 36. The cache controller 36 determines if a CT hit occurs (step 58). If there is a CT hit, the cache controller 36 uses the data from the L2 data store 38 to fulfill the data read or write command (step 60). That is, if a data read command was issued, the data is sent to the requesting processor 11. If a data write command was issued, the data is overwritten. If there is a CT miss, the system waits at least one cycle (step 62) to determine whether there is a tag store 40 hit (step 64).

If there is a tag store 40 hit, the cache controller 36 uses the data from the data store 38 to fulfill the data command (step 60). Simultaneously, the cache controller initiates a CT updating procedure. The CT updating procedure occurs in two steps. First, the cache controller chooses a CT entry to be replaced (step 66). This choice is made according to one of the well known updating protocols briefly described above, such as Least Recently Used. Second, the tag for the currently accessed data will be stored in place of the chosen tag (step 68).

If there is a tag store miss, the requested data line must be retrieved from the system memory 16 (step 70). The retrieved data used to fulfill the data read or write command (step 60). This newly retrieved data must be added to the cache memory, so the data store 38, the tag store 40, and the CT 42 must be updated to include the data line including this data. The data store 38 and the tag store 40 are updated according to the appropriate protocol (step 72) (this protocol need not be the same as the CT updating protocol). The CT 42 is updated according to steps 66, 68 above.

The CT 42 preferably always contains a complete copy of a subset of the tag in the tag store 40, but at least sufficient bits of each tag to successfully compare the cache tag in the CT with the address tag. If the tag store 40 is updated, this change must be reflected in the CT, either simultaneously or within a predetermined time period. The tag store may be updated for a number of reasons, including ordinary cache memory activities, such as described above; allocation; eviction; replacement; snooping; and other cache functions.

The CT 42 memory organization need not be identical to the tag store 40. For example, the CT 42 may be 8-way associative, while the tag store 40 is direct mapped. The optimum CT and tag store organization depends on the overall computer system and other design considerations and is a decision left to the design engineer.

Contemporary computer system performance is highly dependant on the efficiency of the cache memory module, regardless of whether the system has one or a plurality of processors. The two most desirable features of a cache memory module are (1) large data store size and (2) low access latency. SRAMs satisfy both requirements. However, the speed and size of the memory devices used for the tag store must be carefully considered. To support a cache memory of 2 or 4 megabytes, 128k to 256k bytes of SRAM are needed, respectively. Such a large amount of SRAM is difficult and expensive to integrate on a reasonably priced VLSI chip. Thus, limiting the use of SRAM to the CT 42 has been found to favorably achieve the system goals at low cost.

Preliminary studies have been performed on an experimental embodiment using a 4k byte SRAM in a 4-way set associative organization located on the cache controller chip. These studies resulted in a performance equivalent to a conventional zero-wait state 64k cache memory system. The general performance has been shown to be an 85%–90% hit ratio for the CT; a 10%–14% hit ratio for the L2 tag store; and a 0.1% hit ratio for the system memory. It has been generally agreed that a 64k cache memory system achieves between a 85% and a 90% hit ratio. Although the 4k byte CT has been shown to result in less than a 4% reduction in performance when compared to a more expensive conventional zero-wait state cache controller design (e.g., the "on-chip" tag store described above), it has also shown a 12% increase in performance compared with a conventional one-wait state cache controller design (e.g. the "off-chip" tag store described above). Using the CT on the cache controller chip as shown in FIG. 4 and a slower off-chip memory device, for example a dynamic RAM (DRAM), is used for tag store results in appreciable cost reduction with only minimal reduction in effectiveness from the zero-wait state design and a noticeable improvement over the comparably priced one-wait state design.

The above described embodiments of the invention are intended to be illustrative only. Numerous alternative embodiments may be devised by those skilled in the art without departing from the spirit and scope of the following claims.

We claim:

1. A level 2 cache memory module for a computer system, comprising:

(a) a first data store for storing data units;

(b) a second data store for storing tags corresponding to each data unit stored in the first data store;

(c) a third data store for storing a subset of tags corresponding to data units stored in the first data store, each of the tags in the third data store also being found in the second data store, the third data store having a faster data access time than the second data store; and (d) a cache memory controller for controlling access to data stored in first, second, and third data stores and configured to:

(i) receive a data access request for a data command, the request including an address tag:

(ii) search for data in the first data store and a tag in the second data store corresponding to the address tag and simultaneously initiating a search for the tag in the third data store corresponding to the address tag:

(iii) if the search of the third data store determines that the tag matches a tag stored in the third data store. using the data in the first data store corresponding to the tag stored in the third data store to fulfill the data command, and (iv) if the search determines that the tag does not match any tag stored in the third data store. waiting for a result of the second data store search.

2. The cache memory module of claim 1, wherein the third data store is a static random access memory device.

3. The cache memory of claim 1, wherein the cache memory controller and the third data store are located on a single integrated circuit.

4. The cache memory module of claim 3, wherein the first and second data stores are located on different integrated circuits than the cache memory controller.

5. The cache memory of claim 1, wherein the first data store is a data line store, the second data store is a tag store and the third data store is a caching tag.

6. A level 2 cache memory module for a computer system comprising a processor and a main system memory, said level 2 cache memory module comprising:

a data store for storing a subset of data blocks stored in the main system memory;

a tag store for storing tags indicating which blocks of the main memory are stored in the data store;

a tag cache for storing a subset of the tags indicating which blocks of the main memory are stored in the data store, each tag in the subset also being found in the tag store; and a cache controller for controlling said data store, tag store, and tag cache and configured to:

(i) receive a data access request for a data command, the request including an address tag;

(ii) search for data in the data store and a tag in the tag store corresponding to the address tag and simultaneously initiating a search for the tag in the tag cache corresponding to the address tag;

(iii) if the search of the tag cache determines that the tag matches a tag stored in the tag cache, using the data in the data store corresponding to the tag stored in the tag cache to fulfill the data command and (iv) if the search determines that the tag does not match any tag stored in the tag cache. waiting for a result of the tag store search.

7. The cache memory module of claim 6, wherein said code controller and said tag cache are on one chip and said data store and said tag store are on one or more other chips.

8. The cache memory module of claim 6, wherein said tag cache is a static random access memory device and the tag store is a dynamic random access memory device.

9. A method for accessing data in a system having a processor and a level 2 cache memory comprising a first level 2 data store for storing data units including recently accessed data; a second level 2 data store for storing tags corresponding to data stored in the first level 2 data store; a third level 2 data store, having a faster access time than the second data store, for storing a subset of the tags corresponding to data in the first data store each of the tags in the subset also being found in the second level 2 data store; and a cache controller connected to the first, second, and third level 2 data stores, the method of comprising the steps of:

(a) receiving from the processor a data access request for a data command, the request including a line address and an address tag;

(b) using the line address to search for data in the first level 2 data store and a tag in the second level 2 data store corresponding to the address tag and simultaneously initiating a search for the tag in the third level 2 data store corresponding to the address tag;

(c) if the search of the third level 2 data store determines that the tag matches a tag stored in the third level 2 data store, using the data in the first level 2 data store corresponding to the tag stored in the third level 2 data store to fulfill the data command; and (d) if the search determines that the tag does not match any tag stored in the third level 2 data store, waiting for a result of the second level 2 data store search.

10. The method of claim 9, wherein the computer system further comprises a system memory and after waiting for a result of the second level 2 data store search, further comprising the steps of:

(a) if the second level 2 data store search determines that the address tag matches a tag stored in the second level 2 data store:
  (i) using data in the first level 2 data store corresponding to the tag stored in the second level 2 data store to fulfill the data command; and
  (ii) updating the third level 2 data store to include as an entry the tag stored in the second level 2 data store; and (b) if the second level 2 data store search determines that the address tag does not match any tag stored in the second level 2 data store:
  (i) retrieving data from the system memory,
  (ii) using the retrieved data to perform the data command;
  (iii) updating the second and third level 2 data stores to include tags corresponding to the retrieved data; and
  (iv) updating the first level 2 data store to include as an entry the retrieved data.

11. The method of claim 10, wherein the step of updating the third level 2 data store further comprises:

(a) choosing an entry in the third level 2 data store to be replaced; and (b) replacing the chosen entry with one of the tags stored in the second level 2 data store and the tag corresponding to the retrieved data.

12. The method of claim 9, wherein the data command is one of either a read command and a write command.

13. The method of claim 12, wherein the step of fulfilling the data command comprises sending the data to the processor when the data command is a read command.

14. The method of claim 13, wherein the step of fulfilling the data command comprises overwriting the data when the data command is a write command.

* * * * *